United States Patent [19]

Furda et al.

[11] 3,934,048

[45] Jan. 20, 1976

[54] MULTIFUNCTIONAL SWEETENING COMPOSITION

[75] Inventors: Ivan Furda, Pleasantville; Jerome F. Trumbetas, Tarrytown, both of N.Y.

[73] Assignee: General Foods Corporation, White Plains, N.Y.

[22] Filed: Nov. 21, 1973

[21] Appl. No.: 417,855

[52] U.S. Cl................................. 426/548; 426/658
[51] Int. Cl.².......................................... A23L 1/236
[58] Field of Search........... 426/212, 213, 215, 217, 426/380, 364, 548

[56] References Cited
UNITED STATES PATENTS

| | | | |
|---|---|---|---|
| 2,719,179 | 9/1955 | Mora et al. ......................... | 260/209 |
| 3,753,739 | 8/1973 | Cella et al........................ | 426/217 X |
| 3,761,288 | 9/1973 | Glicksman et al. ............. | 426/217 X |
| 3,766,165 | 10/1973 | Rennhard ....................... | 426/213 X |

*Primary Examiner*—A. Louis Monacell
*Assistant Examiner*—Esther L. Massung
*Attorney, Agent, or Firm*—Daniel J. Donovan; Bruno P. Struzzi; Doris M. Bennett

[57] ABSTRACT

A low calorie, low-hygroscopic, quick-dissolving sweetening composition is obtained by co-drying a solution of a dipeptide sweetening agent with an edible, bland, low calorie polysaccharide in defined ratios.

9 Claims, No Drawings

MULTIFUNCTIONAL SWEETENING COMPOSITION

BACKGROUND OF THE INVENTION

The present invention relates to a sweetening composition having the desirable sweetness intensity and rate of solubility of sucrose without the accompanying caloric content. More specifically, this invention pertains to a sweetening composition having the above mentioned properties which comprises a dipeptide sweetener and an edible, bland, low calorie polysaccharide and the method of making the same.

It is well known that the dipeptide compounds of this invention set forth principally in U.S. Pat. Nos. 3,475,403 issued Oct. 28, 1969, 3,492,131 issued Jan. 27, 1970, 3,695,898 issued Oct. 3, 1972 and more recently 3,714,139 issued Jan. 30, 1973 possess intensely sweet and low calorie properties. It has also been determined, however, that these compounds as a class have a markedly slower rate of solution than sucrose making their use in food and beverage systems impractical notwithstanding their attractiveness as low calorie sweetening compounds.

Methods for improving solubility which are known in the art could foreseeably function effectively with these compounds such as admixing the same with fumaric and/or adipic acid, incorporating a surface active agent or combining these dipeptides with certain dry bulking agents which may or may not affect their solubility. However, these compounds do not serve the purpose of this invention which is to produce a sweetening composition having not only a satisfactory rate of solubility and low calorie content, but also a "keeps well" property due to low hygroscopicity. At the same time, addition of a compound which would impart any type of aftertaste resulting in an alteration of the natural sweet properties of the dipeptide is highly undesirable and therefore a bland bulking agent would be preferred.

In the light of a great demand for new functional sweetening agents, the invention herein presented fulfills the above mentioned criteria so important from a food technological as well as consumer point of view.

SUMMARY OF THE INVENTION

It has been found that polymaltose and polymerized dextrins which are non-toxic, bland, low-calorie synthetic polysaccharides prepared by acid catalyzed polymerization under vacuum ($10^{-5}$ to 10 mm Hg) at elevated temperatures (100°C to 170°C) first taught by British Patent No. 1,182,961 issued Mar. 4, 1970, U.S. Pat. No. 3,325,296 and *Advances in Carbohydrate Chemistry*, "Chemical Synthesis of Polysaccharides" Vol. 21, 1966, when co-dried with a dipeptide serves the multifunctional purpose of this invention. Explicitly, when polymaltose, a polymerized dextrin such as polymaltodextrin or combinations thereof and L-aspartyl-L-phenylalanine methyl ester, hereinafter referred to as APM, are either dry mixed in a pre-defined ratio and placed in solution, or solutions of the same combined to give the pre-defined ratio of APM to synthetic polymer, and thereafter co-dried by either drum drying, freeze-drying, spray-drying or similar such methods, a dry sweetening composition which is low in calories, low in hydroscopicity, devoid of unpleasant aftertaste and at least two to six times faster dissolving than APM alone is obtained.

Combining these dipeptides with other carbohydrates such as fructose, invert sugar, dextrin and the like by known co-drying techniques serves to increase the sweetness of the resulting composition by reason of contributing its own sweetness of the system and at the same time prevents deliquescense of these carbohydrates under moist conditions due to the high hygroscopicity of the same. Although combining dipeptides sweeteners with these carbohydrates results in a multifunctional composition of increased sweetness and lowered hygroscopicity, these carbohydrates are high in calorie content and have characteristic flavor notes of their own. Since the primary object of this invention is to produce a multifunctional sweetening composition which is also low in calories and devoid of aftertaste, reference will henceforth be made to the aforementioned bland, low calorie synthetic polysaccharides.

Since, polymaltose and the polymerized dextrins are hygroscopic, and the dipeptides of this invention have extremely poor solubility, the multifunctional sweetening formulation derived results from the retention of only the desirable qualities of each starting material. The ability of APM to eliminate the tendency of these synthetic polymers to deliquesce under moist conditions can be explained by the hydrophobic character of the benzene ring on the dipeptide molecule which functions to reduce the hygroscopicity of the polymer by reason of contributing its own hydrophobicity to the system. Thus, the higher the ratio of dipeptide to polymer, the less hygroscopic the system becomes. This does not involve any chemical interaction between the two components, however, and therefore, no relinquishment of sweetness by the dipeptide is experienced. Alternatively, the rate of solubility of the dipeptide, specifically APM is increased by relying upon the innately high rate of solubility of these polymers. Thus the higher the ratio of polymer to dipeptide, the more rapidly soluble the sweetening composition becomes. Since the interests are conflicting in terms of acquiring the most desirable degree of solubility and hygroscopicity, the dipeptide and polymer should be in sufficient proportion to produce a sweetening composition which is both fast dissolving and low in hygroscopicity.

This invention finds utility as a non-hygroscopic table sweetener or in virtually any foodstuff where characteristic low calorie content, rapid solubility and "keeps-well" properties are desired.

Accordingly, it is the principle object of this invention to produce a sweetening composition which is low in calories, rapidly soluble, non-hygroscopic and devoid of unpleasant after-taste due to the addition of compounds known to increase dispersibility and/or lower hygroscopicity.

The above and additional objects of this invention are accomplished by co-drying a solution of a dipeptide sweetener and an edible, bland, low calorie polysaccharide. The invention is predicated upon the discovery that when the dipeptide and polysaccharide are in a defined ratio range, it is possible to produce a dry sweetening composition which when placed in solution and dried has the beneficial properties of rapid solubility and low-hygroscopicity in addition to being low in calories.

The features of this invention which are believed to be novel are distinctly set forth and claimed in the concluding portion of this specification.

DESCRIPTION OF THE INVENTION

The multifunctional sweetening composition of this invention is prepared by co-drying a solution of a dipeptide sweetener with an edible, bland, low calorie polysaccharide. The term "dipeptide" as used throughout this invention is intended to refer to both the unmodified dipeptide sweeteners and the non-toxic soluble salts thereof. The dipeptide salts increase the rate of solubility of the dried formulation but are more hygroscopic than the unmodified dipeptide and lend an acid flavor to the final product. Therefore, employing a sweetening amount of these salts in for example, fruit-type beverages or the like where an acidulous note is acceptable is preferred only where a faster rate of solubility is of more import than the accompanying increase in hygroscopicity. The term "polysaccharide" as used throughout the description of this invention is intended to refer to any edible polysaccharide which is bland, low in calories and readily soluble in aqueous systems. Currently, these characteristics are embodied in polymaltose and polymerized dextrins. The dextrins utilized are preferably those having a dextrose equivalent (D.E.) greater than 20. These dextrins are particularly preferred since polymerization occurs more readily with the greater amount of reducing groups present. In addition, the high D.E. polymerized dextrins are less susceptible to enzyme hydrolysis due to their highly branched structure. It should be obvious to those skilled in the art that compounds enjoying the aforementioned properties which have not been named specifically in this invention are intended for inclusion in the same especially those which are low in hygroscopicity.

The solution may be prepared by simply homogenously co-mixing the artificial sweetening agent with the polysaccharide and combininng the same into one homogenous solution or by similar known manners. The salient point of this invention is that when the sweetener and polysaccharide are in sufficient proportion to one another, the dry composition demonstrates both the desirable rate of solubility of the polysaccharide and the hydrophobicity of the sweetener when placed in solution and co-dried. Concentrations of these compounds are usually in the range of about 1:19 to about 3:7 by weight of the dipeptide to polysaccharide about 1:3 to about 1:4 preferred. It should be obvious to those skilled in the art that variations from this ratio range may be had and a low calorie, sweet composition be derived. However, it has been found that the aforementioned ranges serve to produce a low calorie sweetening composition which is in addition low-hygroscopic and rapidly soluble in aqueous systems. Consequently, appreciable variances from the aforementioned ranges will not produce an artificial sweetening composition having all of the desirable properties previously set forth.

As the sweetness level of the multifunctional formulation may be adjusted according to the specific requirements of the foodstuff by changing the ratio of sweetener to polyglucose, so may the bulk density of the end product be adjusted by selecting the proper drying procedure. Freeze-drying produces the lowest bulk density product and eliminates the possibility of thermal degradation but is the most expensive means of co-drying the composition. However, since this method does produce a final product with the fastest rate of solubility in terms of other drying methods, it is preferred where rate of solubility is a prime consideration. In addition, the possibility of thermal degradation of the dipeptide is eliminated. In terms of deriving a matrix appropriate for use as a table sweetener, it is important that the drying conditions be carried out by a method which effectively bulks the matrix formed as by achieving a distinct blistering effect by spray-drying the solution under conditions which result in a bulk compatible with like sweetening effects of an equal volume of sucrose. Such a product is preferably produced by spray-drying. However, it may also be produced by drum drying, either atmospherically or under a vacuum. Desirably, the spheres produced by spray drying are less dusty, more glossy in appearance, and more suggestive of a crystalline table sugar product than the drum dried product which has a relatively extreme degree of dustiness. The intended bulk of the product is a matter within the skill of the calling. Thus, it is within the scope of this invention to agglomerate the dry product to achieve a bulking effect which agglomeration may be practiced by a grinding of a spray-dried or otherwise dried matrix material and then an agglomeration of discrete particles. Known methods of agglomeration which may be conducted with a minimum of hydration are preferred since the dipeptide sweeteners of this invention tend to decompose after prolonged exposure to the same.

In all instances, the better quality product especially from a hygroscopicity and deliquescence point of view can be prepared when the polysaccharide is purified as by solvent precipitation or ultrafiltration. The ultra-filtrated polysaccharide is preferred not only because of the undesirability of using large amounts of flammable solvents, but mainly due to the fact that the molecular size of the product can more easily be controlled making it possible to eliminate virtually all of the low molecular weight reaction products. These products contain appreciable amounts of reducing groups which, when present, could react with the free amino group of the dipeptide sweetener to cause a reduction in sweetness. Polymaltose and polymerized dextrins are not currently available but are prepared by the polymerization of maltose or dextrins respectively by using preferably phosphoric acid as a catalyst at elevated temperatures and reduced pressure. These polysaccharides may also be prepared by controlled polymerization of maltose or a dextrin with sorbitol and polycarboxylic acid at specified ratios which may result in two unpurified forms—an acid fused form and a bleached neutralized form. The latter surprisingly demonstrates a faster rate of solubility when co-dried with APM than the acid form and is, therefore, preferred.

Generally, the low molecular weight fragments present in the unpurified polysaccharides account for the high degree of hygroscopicity. Consequently, when these synthetic polymers are purified as for example by ultrafiltration where such undesirable low molecular weight fragments are removed, the hygroscopicity of these polymers is reduced making it possible for higher ratios of polymer to dipeptide to be utilized without an accompanying increase in hygroscopicity. In addition, where a phosphoric acid catalyzed polymer is utilized, a significantly improved rate of solubility is achieved. The preferred phosphoric acid catalyzed polymaltose or polymerized dextrin may generally be prepared by dispersing maltose or a dextrin respectively in water which solution is heated for complete dissolution of the carbohydrate material. Either prior to heating the solution, during the dissolution of the carbohydrate or subsequent to having obtained a homogenous solution, a catalytic amount of phosphoric acid is added to the solution to keep the solution to a pH of preferably about 1.8 to about 2.4. The solution is thereafter dried in a vacuum-type dryer such as a rotary evaporator to form a thick syrup having a moisture content of usually no higher than 10 percent. The utilization of vacuum heating is necessary in order to effect the desirable degree of polymerization which is usually about 10 to about 100 anhydroglucose units. The resultant material is then dissolved in water and preferably neutralized by adding a neutralizing amount of alkaline solution. The solution is preferably ultrafiltrated in order to remove low molecular weight fragments. The sweetener may thereafter be added to the solution prior to spray-drying, freeze-drying, drum-drying or the like.

Accordingly, for reasons of rate of solubility and stability, the preferred embodiment of this invention is to co-freeze-dry a solution of L-aspartyl-L-phenylalanine methyl ester (APM) with an ultrafiltrated neutralized phosphoric acid — catalyzed polymaltose or polymerized dextrin at a ratio of about 1:3 to about 1:4 by weight of APM to the polymer.

Upon reading the disclosure, those skilled in the art will be aware of a number of modifications and variations. It is contemplated that these modifications and variations be included within the scope of the present invention which is defined by the following claims:

What is claimed is:

1. A process for producing a low calorie sweetening composition which is readily soluble in aqueous systems, low in hygroscopicity and devoid of aftertaste which alters the sweetness thereof which comprises:
   a. forming an aqueous solution of a carbohydrate selected from the group consisting of maltose and dextrins having dextrose equivalent greater than 20;
   b. heating the carbohydrate solution until the carbohydrate is completely solubilized;
   c. adding a catalytic amount of phosphoric acid to the heated solution in order to catalyze the polymerization of the carbohydrate;
   d. vacuum drying the acidified heated solution to form an acidified carbohydrate syrup;
   e. vacuum heating the acidified carbohydrate syrup to obtain a polymer residue;
   f. forming an aqueous solution of dipeptide sweetener with the polymer in a respective weight ratio range of about 1:19 to about 3:7.
   g. drying the dipeptide sweetener/polymer solution.

2. The process of claim 1 wherein the dipeptide is L-aspartyl-L-phenylalanine methyl ester.

3. The process of claim 2 wherein the catalytic amount of phosphoric acid is added to bring the solution to a pH of about 1.8 to about 2.4.

4. The process of claim 2 wherein the polymer residue is dissolved in water and neutralized prior to combining with the dipeptide.

5. The process of claim 3 wherein the neutralized polymer solution is ultrafiltrated.

6. The process of claim 3 wherein the dipeptide sweetener and polymer are in the respective weight ratio range of about 1:3 to about 1:4.

7. The process of claim 3 wherein the dipeptide sweetener/polymer is freeze-dried.

8. The process of claim 3 wherein the dipeptide sweetener/polymer solution is dried to a final moisture content of no higher than 10 percent.

9. The product of process according to claim 1.

* * * * *